UNITED STATES PATENT OFFICE 2,592,674

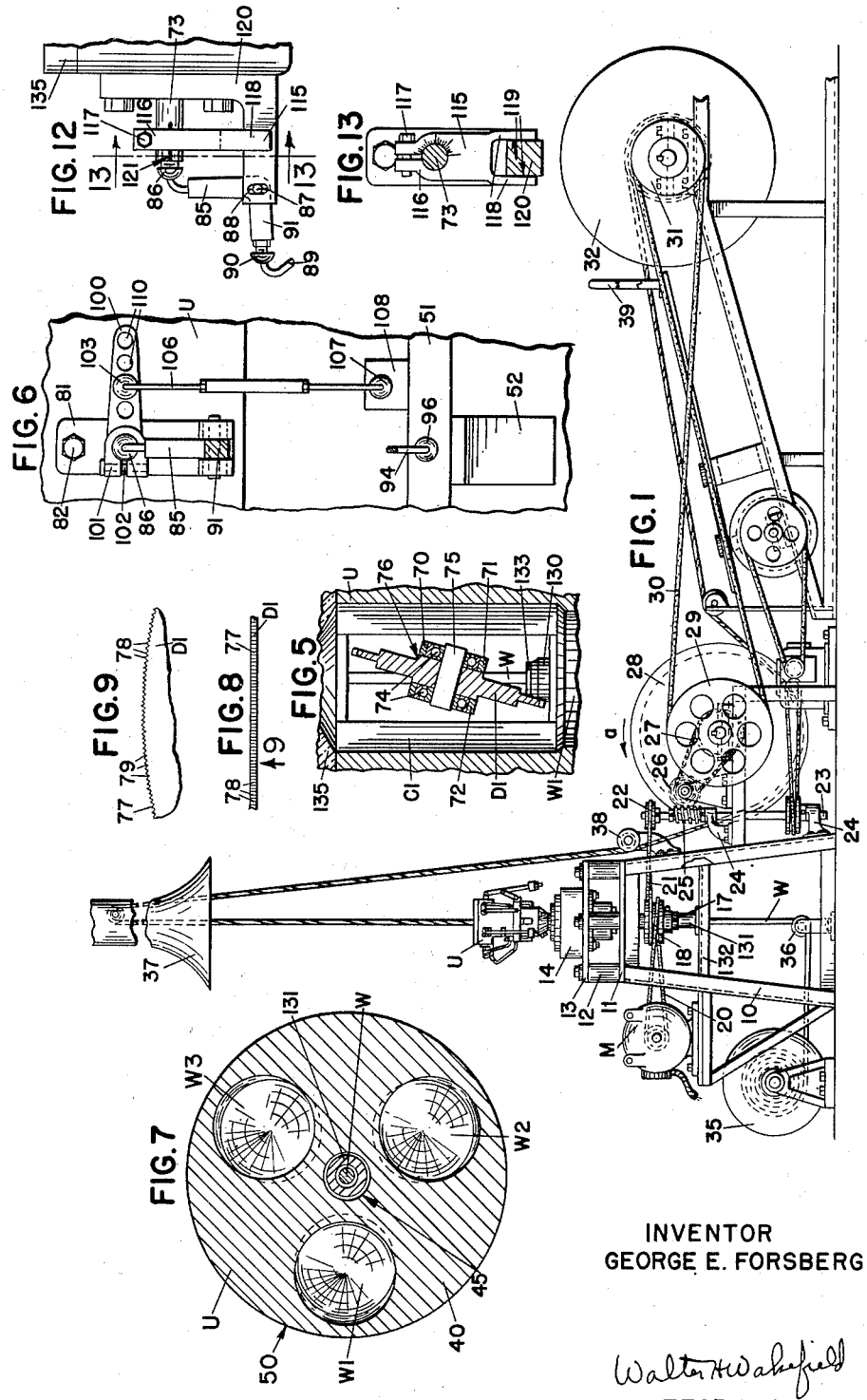
April 15, 1952 — G. E. FORSBERG — 2,592,674
STRIPING MACHINE FOR ELECTRIC CONDUCTORS AND THE LIKE
Filed March 22, 1949 — 3 Sheets-Sheet 1
INVENTOR
GEORGE E. FORSBERG
ATTORNEY

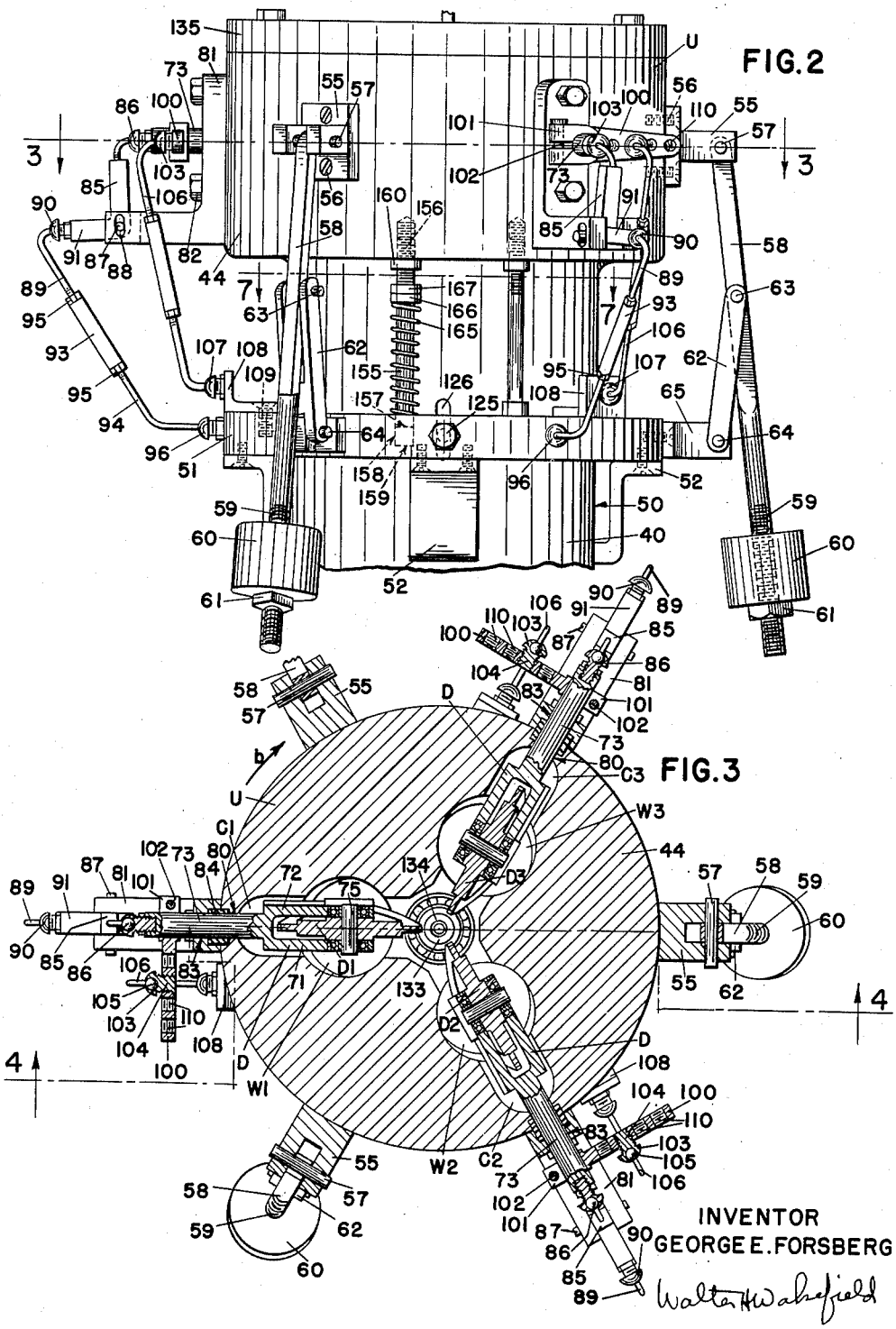

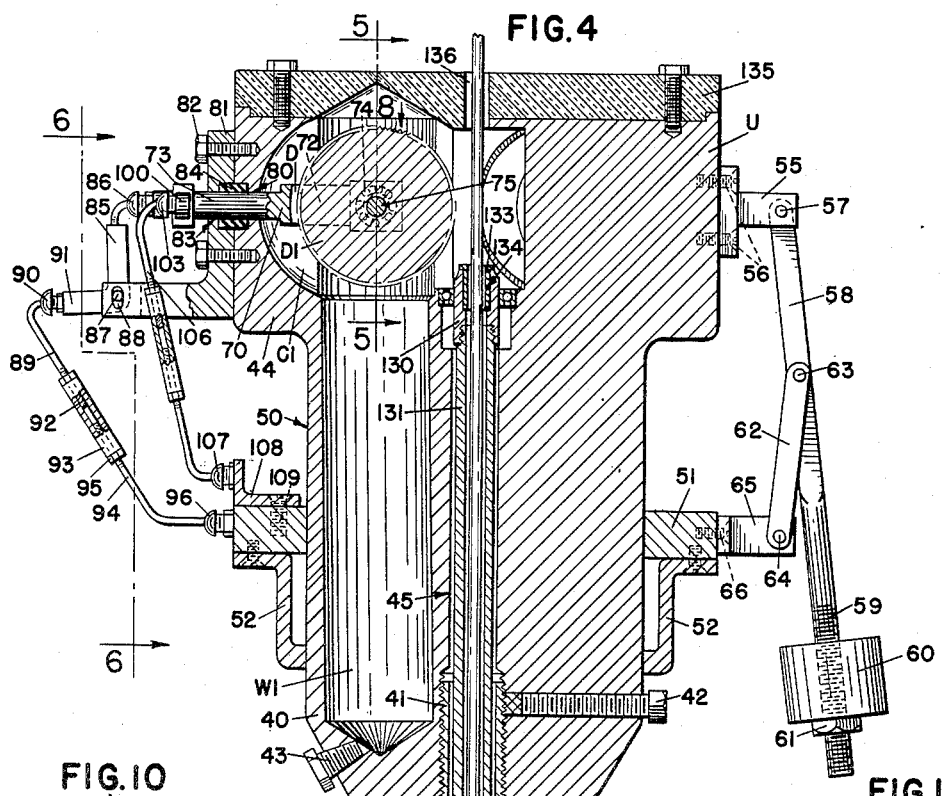

STRIPING MACHINE FOR ELECTRIC CONDUCTORS AND THE LIKE

George E. Forsberg, Worcester, Mass., assignor to Surprenant Mfg. Co., Boston, Mass.

Application March 22, 1949, Serial No. 82,732

13 Claims. (Cl. 118—221)

This invention relates to improvements in machines for producing distinguishing stripes on an elongated article, such as an electric conductor, and it is the general object of the invention to provide a machine capable of ready adjustment for striping conductors of different diameters.

When a large number of electric conductors are used in a cable or in electric installations it is desirable to be able to identify the different wires, as by some form of marking. Heretofore I have proposed a machine in which this marking can be done by producing helical stripes applied to the outside of the insulation surrounding the electric wire. These stripes extend helically around the conductor so that a comparatively short length of the latter will show a complete identifying pattern. The stripes produced by that machine are applied by disks having peripheral driving engagement with the wire as the latter is moved through the machine. In order to produce stripes with sharp clear edges it is necessary to dispose the planes of the disks at angles which are determined partly by the lay or length of the pattern repeat and partly by the diameter of the wire.

If the conductor is of relatively small diameter the angle of the helical stripe for any given length of lay or pattern repeat will be relatively small, but if a larger wire is to be striped with the same lay the angle will be greater. In similar manner, if the lay is relatively long the angle will be slight, but as the lay gets shorter the angle increases.

It is an important object of the present invention to provide a striping machine so constructed that the angles of the disks can be varied with respect to the axis of the conductor according to the diameter of the latter. This variation in angle can be effected automatically as the striping disks move toward and ultimately engage the conductor, or the angle can be preset.

In order that the striping disks may be used with conductors of different diameters it is a further object of the invention to mount the disks on carriers or the like which are movable in a direction toward and from the conductors so that the disks can be moved to separated or open non-striping position when a conductor is being threaded through the machine, after which the disks are moved into engagement with the conductor. This movement of the disks is preferably effected automatically by some form of actuator or operator responsive to centrifugal force and acting as the machine speeds up to move the disks from their spaced or open position into striping position in engagement with the conductor.

In order that a large number of conductors may be distinguished readily in a cable or installation it is desirable to have a plurality of stripes on the wire. These stripes are produced by two or more disks which revolve around the axis of the machine and conductor and have simultaneous engagement with the latter at a striping station. All of the disks when moving to striping position should engage the conductor at the same time, and in order that this result may be achieved it is a further object of the invention to provide an equaliber operatively connected to all of the disks and having a motion derived preferably from centrifugally acting mechanism to move relatively to the striping unit as the latter speeds up.

When it is desired that the aforesaid angular adjustment of the disks be accomplished automatically and simultaneously with motion of the disks toward striping position the equalizer can be utilized not only to effect motion of the disks toward the wire but also uniformly change their angles as they move toward the conductor.

Even though care is used in extruding insulation on an electric wire it is found that slight variations in the diameter of the extruded insulation occur from point to point along the length of the conductor. In order to enable the disks to remain in striping relationship with respect to the conductor it is a further object of the invention to hold the disks in striping position by a yieldable force which will permit the disk peripheries to follow the outer surface of the insulation even though the diameter of the latter should vary slightly along its length.

The previously mentioned equalizer can if desired be so mounted that as the machine comes to rest the equalizer will fall by gravity and in doing so move the disks automatically out of engagement with the conductor and hold them in such position that they will not interfere with the threading of a new conductor through the machine.

The disks will be disposed around the conductor to engage the latter at several points so that it can be centered on the axis of the striping machine. By having the disks moved by centrifugal force as the striping machine speed up the disks approach the conductor while revolving around it and this relationship assists the disks in centering the conductor should its axis deviate slightly from the axis of the striping machine. The fact that the disks are also oblique with respect to the conductor further facilitates this centering of a conductor.

With these and other objects in view which will appear as the description proceeds, the invention resides in the combination and arrangement of parts hereinafter described and set forth.

In the accompanying drawings, wherein two forms of the invention are set forth:

Fig. 1 shows a side elevation of a striping machine made according to the preferred form of the invention, Fig. 2 is an enlarged elevation of the upper end of the striping unit shown in Fig. 1, Fig. 3 is a horizontal section on line 3—3, Fig. 2, Fig. 4 is a vertical section on line 4—4, Fig. 3, Fig. 5 is a slightly enlarged vertical section on line 5—5, Fig. 4, Fig. 6 is an enlarged vertical section on line 6—6, Fig. 4, Fig. 7 is a horizontal section on line 7—7, Fig. 2, Fig. 8 is an end-on view looking at the periphery of one of the striping disks, Fig. 9 is a side view looking in the direction of arrow 9, Fig. 8, Figs. 10 and 11 illustrate diagrammatically conductors of two different diameters with a single stripe thereon, Fig. 12 is a view similar to part of Fig. 4 but showing the modified form of the invention, and Fig. 13 is a vertical section on line 13—13, Fig. 12.

Referring to Fig. 1, a frame 10 has a table 11 supporting uprights 12 on which a plate 13 is mounted. A hollow block 14 bolted to the plate supports an upper ball bearing 15 and a second ball bearing 16 is mounted on plate 13. These bearings have a common vertical axis and support for rotating the stem 17 of a striping unit or head U. Secured to the lower end of the stem or hollow shaft 17 is a pulley 18 by means of which the unit U can be rotated.

Frame 10 supports a motor M driving a belt 20 trained around pulley 18, and a second belt 21 also trained around the pulley extends to the right to a pulley 22 secured to the upper end of an upright shaft 23 guided in bearings 24.

A worm 25 secured to shaft 23 meshes with a worm wheel 26 driving a belt 27 which turns a feed drum 28. A driving pulley 29 turning with the drum is connected by a crossed belt 30 to a pulley 31 by means of which a wind-up reel 32 is turned. The feed drum and wind-up reel are suitably mounted for rotation as will be apparent from Fig. 1.

The wire W or the like to be striped is drawn from a supply drum 35 and extends around a bottom guide pulley 36 and then upwardly through hollow shaft 17 and the striping unit U to be described in detail hereinafter. From unit U the wire extends upwardly through a heating chamber 37 and then down around a small guide pulley 38 and is wrapped around the feed drum 28 to have close frictional contact therewith. From drum 28 the wire extends to a traversing arm 39 which winds it evenly on the wind-up reel. The details of the driving connection between the pulley 31 and reel 32 are not shown, but they will ordinarily inclued some form of compensating slip friction feed which will accommodate itself to the increasing diameter of the wire as the latter is wrapped on the reel.

In the operation of the matter thus far described rotation of motor M causes feed drum 28 to turn in the direction of arrow a, Fig. 1, to draw the wire W from the supply drum upwardly through the striping unit U. The connections between hollow shaft 17 and feed drum 28 are such that they will always move at the same proportionate rate even though there should be variations in the speed of the motor.

The rotatable striping unit U made according to the preferred form of the invention is shown more particularly in Figs. 2 to 7 and briefly includes ink wells or reservoirs communicating at their upper ends with inclosed inking chambers in which are located striping disks mounted for peripheral driving engagement with the wire W. The wells and disks revolve around the wire as it moves upwardly, and the wire moves along the axis of rotation of the unit or head.

In greater detail, the striping unit U comprises a base 40 which is held to the upwardly extending threaded stem 41 of shaft 17 by set screw 42. This base 40 is provided with three preferably cylindrical ink wells W1, W2 and W3 the axes of which may be slightly oblique and inclined downwardly and toward the axis of shaft 17. These wells hold the striping agents, which may be inks or other striping fluids. A plug 43 at the lower end of each well affords means by which it can be cleaned out when it is desired to change from one color ink to another color.

The upper end of the base 40 is of enlarged diameter as at 44 and is formed with three recesses C1, C2 and C3 which extend more or less radially from the axis of rotation of the striping unit and the wire W. These three recesses are in communication with each other and each communicates with the corresponding ink well below it. The base 40 is provided with a central axial bore 45 larger than the largest size of wire to be striped on the machine.

The matter thus far described may be similar to a striping machine already proposed by me. Striping ink is placed in the wells while the machine is at rest, and then as the motor rotates the head U centrifugal force causes the ink to rise from the wells into the inking chambers and the ink is kept in the outer part of the chambers and does not mix despite the fact that the chambers all communicate with each other.

In carrying the present invention into effect provision is made for producing helical stripes of different lays on conductors of different diameters. In order to understand the purpose of the invention reference may be had to Figs. 10 and 11 which represent respectively a small diameter conductor having a spiral stripe of long lay and a large diameter conductor having a spiral stripe of shorter lay.

In the right angle triangle T, Fig. 10, the vertical side L represents the lay of the stripe S of a small wire SW and the horizontal line SC represents the small circumference of the wire. The hypotenuse H represents the stripe S and the angle A is the angle which the stripe makes with an element of the cylindrical surface of the conductor. Angle A is determined by both the lay of the stripe and the size or circumference of the wire, and is comparatively small. If L were longer or shorter and SC remained as shown, A would be smaller or larger, as the case may be.

In triangle T' the lay L' of stripe S', Fig. 11, is shorter than L, and the larger circumference LC is greater than SC. The hypotenuse H' is therefore more oblique to an element of the surface of wire LW, and angle A' is much larger than angle A. The triangles T and T' represent only two of the numerous proportions involving the lay of the stripe and the circumference of the conductor which are encountered in the production of various conductors, and it will be understood that angles A and A' are only two of many angles which the stripe may have relative to the conductor. The planes of the striping disks to be set forth in more detail hereinafter should bear angles to the conductor at least approximating the angle of the hypotenuse of a triangle such as shown in Figs. 10 and 11, but proportioned to the particular lay and size of the conductor to be striped.

Having in mind the angular relations already described, and having further in mind that it is desired to move the striping disks bodily toward and from the conductor, the following description will set forth first the mechanism by which the preferred form of the invention is carried into effect, wherein the angular adjustment of the disks is automatic, and then the modified form will be described, wherein the angular adjustment is manual.

The base 40 of unit U has a cylindrical surface 50 concentric with the axis of the machine. A weighted sleeve 51 fits around surface 50 and is slidable vertically thereon but tends due to its weight to fall to a low position. The sleeve may have secured thereto depending arms 52 the lower ends of which engage surface 50 to prevent cramping of the sleeve on the base 40 and insure freedom of sliding movement as the sleeve rises and falls.

The sleeve is acted upon by a plurality of centrifugally acting lifter mechanisms three of which are shown as distributed equally around the sleeve and base. Since these mechanisms are all alike a detailed description of but one of them will be given.

A bearing 55 is secured to the upper part of base 40 by means of screws 56 and carries a pin 57 on which is pivoted the upper end of an arm 58. This arm is preferably straight and has its lower end provided with screw threads 59 on which is threaded a flyball 60 held in adjusted position along the length of the arm by a lock nut 61. A lifting link 62 has its upper end pivoted at 63 to the rod and its lower end is pivoted as at 64 to a small stand 65 secured by screws 66 to the outer part of sleeve 51. Centers 57 and 64 are preferably one over the other and equally spaced from center 63.

When the base 40 is at rest sleeve 51 and flyball 60 are in low position, but as the machine is started in operation centrifugal force causes the flyball to move outwardly from the axis of rotation and link 62 causes sleeve 51 to rise along surface 50. When the machine is stopped the sleeve and flyball again move to low position.

As shown herein there are three disk units D for the three disks D1, D2 and D3. These disk units are alike and a description will be given of but one of them, namely, for the disk D1. The flyballs and sleeve 51 and associated parts may be considered as an actuator for the disk units.

A disk carrier or mounting 70 is forked at its inner end to provide two spaced arms 71 and 72 and has a cylindrical stem 73 at its outer end. Axially aligned ball bearings 74 in arms 71 and 72 support the disk D1 for rotation on or relatively to the carrier 70. The disk has gudgeons 75 fitting the ball bearings and has shoulders 76, one on each side thereof, to engage the arms 71 and 72 to prevent end play and hold the disk with the plane thereof passing through the axis of stem 73. The disk has a striping circular periphery 77 concentric with the axis of gudgeons 75 and preferably formed with transverse knurling defining ridges 78 and grooves 79. Gudgeons 75 may be driven into the disk.

Stem 73 is slidably mounted on the striping unit and extends through a bore 80 leading through the unit U outwardly radially from chamber C1. A bearing 81 secured to unit U by screws 82 has a second bore 83 through which the stem 73 extends. A packing 84 between the bearing bores 80 and 83 prevents outward flow of ink from the chamber C1.

A lever 85 has a ball and socket connection 86 with the outer end of stem 73. Lever 85 has secured thereto a pivot pin 87 extending through a pair of short vertically extending slots 88 in a forked foot extending outwardly from bearing 81. A rod 89 having a ball and socket connection 90 with the arm 91 of lever 85 has the lower end thereof formed with right hand screw threads 92 fitting similar threads formed internally in the upper end of an adjusting link 93. A second rod 94 has its upper end formed with left hand screw threads fitting into the bottom of link 93. Nuts 95 hold the adjustments of link 93 and the rods 89 and 94.

The lower end of rod 94 has a ball and socket connection 96 with the sleeve 51. By reason of the train of operative connections between ball and socket joints 86 and 96 upward movement of sleeve 51 causes inward movement of the disk unit supporting disk D1, and conversely, when sleeve 51 descends the disk unit moves outwardly. Disk D1 is therefore spaced from the conductor W when unit U is at rest, but as the latter is set in rotation the flyballs raise sleeve 51 and disk moves inwardly until it has driving peripheral engagement with the conductor, whereupon the latter due to its motion along the axis of the machine rotates the disk on its carrier and deposits ink on the conductor to produce a stripe thereon as the disk revolves around the conductor. The outer part of the disk is immersed in the ink in chamber C1, and when turned as described presents its inked or wetted periphery to the conductor.

Another feature of the preferred form of the invention relates to the automatic changing of the angle of the disk as the latter approaches the conductor. From the discussion of Figs. 10 and 11 it will be understood that the angle of the disk relatively to the conductor should decrease as the disk moves toward the axis of the machine.

In order to accomplish automatic adjustment of the plane of the disk an arm 100 having a split hub 101 clamped by screw 102 is provided with a ball socket 103 tapped thereinto as at 104. A ball 105 fitting socket 103 is at the upper end of a link or rod 106 the lower end of which has a ball and socket connection 107 with a small plate 108 secured as at 109 to sleeve 51. Link 106 may be adjustable as to length in a manner similar to the adjustment of the link between the sleeve and lever 85.

As sleeve 51 rises link 106 turns the disk unit to change the angle of the plane of the disk as the latter moves inwardly, and in a direction to lessen the angle. Arm 100 is provided with a plurality of tapped holes 110 at different distances from stem 73 each capable of receiving socket 103. This provides means for varying the amount of angular movement of the disk unit for a given amount of vertical motion of sleeve 51. Adjustment is made in this way for different lays of the spiral stripes. If the lay is short socket 103 will be tapped into one of the holes 110 near stem 73, but if the lay is longer socket 103 will be located in one of the outer holes 110.

It will thus be seen that as sleeve 51 has an operating motion and rises as the unit U gets up to speed the disk D1 will be moved in toward the conductor and at the same time have its angle reduced. If the conductor is large in diameter the disk will engage it early in its inward travel before the angle has been reduced very much, but if the wire is small the angle will be still further reduced before the disk and wire contact. The position of flyball 60 along rod 58 can be varied to effect the desired amount of force exerted by the disk against the conductor. Since this force is yieldingly exerted the disk can move radially relatively to the axis of the machine should slight variations exist in the diameter of the conductor at different points along its length.

Although the description thus far has been in connection with disk D1, it will be understood that the other disks are controlled similarly and simultaneously with disk D1, and that all the disks move in and out and also angularly in unison. Sleeve 51 acts as an equalizer between the flyballs and the disk units to give the latter similar motions.

The disks will be revolving around the conductor as they approach it and will thus tend to center the conductor on the axis of the machine should it be slightly off center. Also, the fact that the disks are at angles to the conductor reduces the chance that the conductor will slip outwardly between two of the disks.

In the modified form of the invention shown in Figs. 12 and 13 provision is made for manual setting of the angle of the disk. In this form the disk angle does not change as the disk moves toward the conductor, but is preset, depending upon the lay and conductor diameter.

The stem 73 has secured thereto a guide 115 the hub 116 of which is split and clamped to the stem by screw 117. Two spaced depending guide fingers 118 engage opposite parallel sides 119 of a stand 120 similar to stand or bearing 81. Hub 116 has a scale graduated in degrees and stem 73 has a graduation 121. When the graduation registers with zero on the scale the plane of the disk on the disk unit will be parallel to the machine axis. By loosening screw 117 the stem can be turned to the desired angle, and the screw then tightened. The disk will then be at the correct angle for the lay of stripe and diameter of conductor to be striped. As the disk unit moves toward the conductor as the striping unit turns the fingers 118 will slide along stand 120 and keep the disk at the preset angle. All the disk units can be set in this manner and the disks will all engage the wire at the same time and at the correct angle.

In order that the striping unit may cause the sleeve or ring 51 to start rotating when the machine is put in operation, without cramping the operating connections for the sleeve, such as rod 58 and link 62, the sleeve has a screw 125 the inner end of which fits into a slot 126 in the surface 50 parallel to the machine axis. Screw 125 travels up and down in slot 126 as the sleeve rises and falls.

Another feature of the invention provides a stationary guide for the conductor just below the inking station at which the disks contact the conductor. This guide has a head 130 secured to the upper end of a tube 131 extending upwardly through the bore 45 and secured to a bracket 132 secured to the frame 10. The conductor leads upwardly through the bottom of the tube and out of the head 130 and thence to the disks. A frictionally held sleeve or guide 133 fits into head 130 and has a guide hole 134 slightly larger than the conductor. When a different size conductor is to be striped the cover 135 extending over the top of the unit U will be removed and the sleeve 133 replaced by another similar sleeve but having a hole to fit the new conductor. Cover 135 has a hole 136 which is larger than the largest conductor which the machine is adapted to stripe.

In order to limit motion of the disks toward the wire, and also limit the force which the disks can exert on the wire, a stop 150 may be used as shown in Fig. 2. This stop is screw threaded at 151 into part of unit U above the sleeve 51 and extends downwardly to engage the top of the sleeve. A lock nut 152 holds the vertical adjustment of the stop.

When a small wire is to be striped the stop will be in a relatively high position and will touch the sleeve and arrest its upward motion when the disks engage the small wire. If a larger wire is to be striped the stop will be moved to a lower position, depending upon the size of the wire.

The centrifugal force of the flyballs will hold the sleeve against the stop, but the later will permit down motion of the sleeve should a thick place in the wire exert an outward force on the disks displacing them in a direction away from the axis of the machine.

A second stop is provided to prevent the disks from engaging each other should the wire break or run out while the machine is running. This second stop comprises a rod 155 tapped at its upper end as at 156 into the unit U and formed at its lower end with a stop shoulder 157. The rod 155 extends into a hole 158 which extends downwardly part way through the sleeve 51 to provide a stop surface 159. A check nut 160 threaded on the upper part of rod 155 holds the latter in fixed position on the unit U. Rod 155 is set so that its shoulder will engage stop surface 159 just before the disks when moving inwardly reach the point where they would touch each other. Once rod 155 has been set it will not be changed and will prevent the disks from damaging engagement with themselves. In usual operations the rod 155 will be slightly above the stop shoulder or surface 159. Stop rod 155 will not interfere with the normal setting of the rod or stop 150 for adjustments to variously sized wires.

When the machine is to be operated at high speeds it may be desirable to counteract some of the centrifugal force developed by the flyballs 60. This can be accomplished by a spring which will exert a counterforce resisting upward motion of sleeve 51. Fig. 2 shows a compression spring 165 surrounding part of stop rod 155 and located between the top of sleeve 51 and an adjusting nut 166 threaded on rod 155. Nut 166 is moved along rod 155 until spring 165 is under sufficient compression to exert the desired counterforce on the flyballs. When the latter move outwardly as the machine speeds up sleeve 51 will rise, but its upward motion is resisted by spring 165. The higher the sleeve rises due to increasing centrifugal force the greater will be the resistance of the spring. The force exerted on the disks tending to move them against the wire will be the difference between the centrifugal and spring forces, and this difference can be reduced to any desired amount by downward adjustment of nut 166. A lock nut 167 is used to hold the adjustment of nut 166.

It is believed that the operation of the machine will be understood from the foregoing description. The unit U turns in the direction of arrow b, Fig. 3, and the disks are oblique with respect to the wire in the direction indicated in Fig. 5. The disks revolve around the wire or conductor and have a peripheral rolling contact or engagement with it so that they turn on their carriers to present freshly inked parts of their rims to the wire to ink it. That part of the inked periphery adjacent to and approaching the wire travels in a path inclined toward the wire and inclined oppositely to the direction of rotation of the striping unit.

The force developed centrifugally by the flyballs serving as actuator means is communicated through the force transmitting sleeve 51 and its connections to the carriers which in turn effect inward motion of the disks and also angular adjustment of them in the preferred form of the invention. In the modification the angle of the disks is preset manually, but the disks are otherwise controlled as in the preferred form. In both forms the spring 165, when used, counteracts some of the centrifugal force of the flyballs and adjustments can be made to regulate the pressure of the disks against the wire. The rotation of the disks on their axes has been described as due to motion of the wire, but when wires of large diameter are being striped and the angle of the disks is relatively great part of their turning may be due to their revolving around the wire. In most instances, however, the primary cause of disk rotation will be movement of the wire.

The cover 135 may be transparent if desired to enable the operator of the machine to observe the relation between the disks and the wire when the stop 169 is being set. The hole 136 can be larger than shown in Fig. 4 for the same purpose. The stationary guide head 130 prevents rotating part of the unit U from engaging and twisting the wire.

Having thus described the invention in two specific forms it will be apparent that variations and other modifications can be made without departing from the spirit of the invention.

What is claimed as new is:

1. In a striping machine, a rotatable unit through the axis of which a wire to be striped moves, means for rotating the unit, a plurality of striping units including disks for peripheries of which are inked and disposed around the wire, a carrier for each disk mounting the latter for rotation, means on the unit mounting the carriers and disks for movement toward the wire and causing the carriers and disks to revolve about the wire, an equalizer surrounding and movable axially on the unit and operatively connected to each carrier, and means including flyball means operatively connected to the equalizer effective by centrifugal force due to rotation of the unit to move said equalizer in a direction to cause said carriers to move said peripheries simultaneously into driving engagement with the wire, the latter due to movement thereof through the machine rotating the disks on their respective carriers while said disks revolve around the wire due to rotation of the unit.

2. In a striping machine, a rotatable unit having a vertical axis through which a wire to be striped moves, means for rotating the unit, a plurality of disks arranged around a wire having peripheries at least one of which is inked, a carrier for each disk mounted on and movable relatively to the unit to move the disk toward and from the wire, each disk being rotatable on the corresponding carrier and each carrier and disk being revolved around the wire by the unit, an equalizer mounted for vertical axial movement on the unit and held by gravity in relatively low position with respect to the unit when the latter is at rest, means including flyballs operatively connected to the equalizer acting by centrifugal force when the unit is rotating to lift said equalizer from said low position, and operative connections between the equalizer and each carrier effective when the equalizer rises from said low position to cause each carrier to move the corresponding disk into peripheral engagement with the wire, the latter due to motion thereof through the machine rotating the disks on their carriers while the disks are revolved around the wires due to rotation of the unit, said equalizer when moving to said relatively low position acting through said operative connections to move the carriers in a direction to move the disks away from the wire.

3. In a striping machine, a rotatable unit through the axis of which a wire to be striped moves, means for rotating the unit, a striping disk, a mounting supported on the unit and on which the disk is rotatably supported extending substantially radially with respect to said axis, said mounting and disk being revolved around the wire by the unit, and means supporting the mounting for sliding movement on the unit in a direction to move the disk into peripheral engagement with the wire and for angular movement relatively to the unit to change the plane of the disk relatively to the axis of the unit to enable the disk to produce a helical stripe on wires of different diameters, the wire causing rotation of the disk on said mounting as the disk and mounting revolve around the wire when the mounting is in position to cause peripheral engagement of the disk with the wire.

4. In a striping machine, a rotatable unit through the axis of which a wire to be striped moves, means for rotating the unit, a striping disk, a carrier on which the disk is rotatably mounted revolved about the wire by the unit, support means on the unit mounting the carrier for sliding movement relatively to the unit in a direction toward said axis to move the disk toward the wire and for angular movement relatively to the unit to change the angle of the plane of the disk relatively to the axis of the unit, actuator means movable axially along said unit and having an operating motion when moving in a given direction, and operative connections between the carrier and actuator means effective when the latter has an operating motion to cause angular movement of the carrier and disk to reduce the angle of said plane relatively to said axis and simultaneously cause sliding movement of the carrier toward said axis to effect peripheral engagement of the disk with the wire, the wire due to motion thereof and peripheral engagement with the disk causing the latter to rotate on the carrier as the carrier revolves the disk around the wire.

5. In a striping machine, a rotatable unit through the axis of which a wire to be striped moves, driving means for rotating the unit, a plurality of carriers, a striping disk on each carrier for peripheral engagement with the wire, means on the unit mounting each carrier for movement angularly relatively to the unit and also in a direction to move the disk thereon toward and from the wire, each carrier and disk being revolved by the unit around the wire, equalizer means movably mounted axially on the unit rotating therewith, actuator means including a flyball acting due to centrifugal force to give a movement to the equalizer means relatively to the unit when the driving means starts rotation of the unit, operative connections between the equalizer means and the carriers moving the latter to move the disks into peripheral driving engagement with the wire to cause the latter due to motion thereof to rotate the disks on the carrier when the equalizer means has said movement, and other operative connections between the equalizer means and the carriers moving the latter angularly relatively to the unit to change the angles of the disks relatively to the wire when said positioning means has said movement.

6. In a striping machine, a rotatable unit through the axis of which a wire to be striped moves, said unit having an outer cylindrical surface concentric with the axis of the unit, means for rotating the unit, a striping disk having a periphery for engagement with the wire, carrier means mounting the disk on the unit for revolution around the wire as the unit rotates and also mounting the disk for movement relatively to the unit in a direction toward and from the wire, a weighted sleeve loosely surrounding said cylindrical surface and movably mounted on the unit for rising and falling movement relatively thereto below the disk and carrier, operative connections between the weighted sleeve and the carrier means effective to hold the disk out of engagement with the wire when the unit is at rest, and actuator means operatively connected to said weighted sleeve effective due to centrifugal force when the unit is rotating to move the weighted sleeve upwardly on the unit and cause said operative connections to move the carrier toward the wire to effect driving engagement between the periphery of the disk and the wire and causing the wire due to motion thereof to rotate the disk to stripe the wire as the disk revolves around the wire.

7. In a striping machine, a rotatable unit through the axis of which a wire to be striped moves, means for rotating the unit during operation of the machine, a striping disk, a carrier on which the disk is rotatably mounted, means mounting the carrier on the unit causing the carrier to be revolved about the wire when the unit is rotating and for movement in a direction to move the disk toward the wire, actuator means including a flyball operatively connected to said carrier acting by centrifugal force due to rotation of the unit to move said carrier to cause peripheral engagement of the disk with the wire, and stop means independent of the wire set to arrest movement of said actuator means and carrier when said disk engages the wire, the wire due to motion thereof and said peripheral engagement with the disk rotating the latter on the carrier as the disk revolves around the wire.

8. In a striping machine, a rotatable unit through the axis of which a wire to be striped moves, means for rotating the unit, a striping disk, a carrier on which the disk is rotatably mounted supported by and movable relatively to the unit to move the disk in a direction toward the wire, said disk and carrier revolving about the wire when the unit is rotating, actuator means operatively connected to the carrier acting by centrifugal force due to rotation of the unit to move the disk into peripheral engagement with the wire, resisting means operatively connected to the actuator acting with increasing resisting force as the unit speeds up to oppose the increasing centrifugal force, the force acting to move the disk against the wire being the difference between the centrifugal and resisting forces, and means to alter the resisting means to vary said difference between the centrifugal and resisting forces and thereby adjust the force holding the disk against the wire.

9. In a striping machine, a rotatable unit through the axis of which a wire to be striped moves, means for rotating the unit, a plurality of striping disks arranged around the wire, a carrier for each disk supporting the latter for rotation, means supported by the unit mounting each carrier for movement relative to the unit to move the disk radially of the unit axis toward the wire and for angular movement relative to the unit to vary the angle of the plane of the corresponding disk relatively to the unit axis, equalizer means mounted on the unit for axial movement therealong, means operatively relating the equalizer to each carrier effective when said equalizer means moves in a given direction relative to the unit to move the carriers angularly to vary the angles of all the disks simultaneously, other means operatively relating the equalizer means to each carrier effective when said equalizer moves in said given direction to move the disks simultaneously into peripheral engagement with the wire, and means operative due to rotation of said unit effective to move said equalizer means in said given direction.

10. In a striping machine, a rotatable unit through the axis of which a wire to be striped moves, means for rotating the unit, a striping disk, a carrier mounted on the unit having the disk rotatably mounted thereon and movable relatively to the unit to move the disk in a direction toward the wire, said unit when rotating causing said disk and carrier to revolve about the wire, weighted means operatively connected to the carrier causing said disk to be spaced from the wire when the unit is at rest, and means operative due to rotation of the unit as the latter speeds up from a state of rest lifting said weighted means and causing the latter to move the carrier toward the axis of the unit and the disk into peripheral engagement with the wire as the disk revolves around the wire.

11. In a striping machine, a rotatable unit through the axis of which a wire to be striped moves, means for rotating the unit, a striping disk, a carrier having the disk rotatably mounted thereon mounted on the unit for movement relative to the unit to move the disk in a direction toward and from the wire, said disk and carrier revolving about the wire when the unit is rotating, and yieldable means supported by the unit operative during rotation of the unit to urge the disks into peripheral engagement with the wire, said wire having frictional driving engagement with the periphery of the disk and rotating the latter relatively to the carrier as the disk revolves about the wire to produce a helical stripe on the wire.

12. In a striping machine, a rotatable unit through the axis of which a wire to be striped moves, means for rotating the unit, a striping disk, a carrier having the disk rotatably mounted thereon slidably mounted on the unit to move the disk to the wire, said unit revolving said carrier and disk about the wire as the unit turns, force transmitting means movably mounted on the unit operatively connected to the carrier, and flyball means on the unit operatively connected to the force transmitting means operative due to rotation of the unit to cause the force transmitting means to move the carrier in a direction to cause peripheral engagement of the disk with the wire, the wire due to motion thereof and peripheral engagement with the disk rotating the latter on the carrier as the carrier and the disk are revolved about the wire due to rotation of the unit.

13. In a striping machine, a rotatable unit through the axis of which a wire to be striped moves, means for rotating the unit, a plurality of striping disks arranged around the wire, a mounting for each disk having the disk therefor rotatable thereon supported on the unit for movement relative thereto to move the disk thereon toward and from the wire, said disks and mountings being revolved around the wire by rotation of the unit, equalizer means mounted for axial movement along the unit and occupying a given position when the unit is at rest and moving to a second position when the unit is rotating, and operative connections between said equalizer means and said mountings effective to hold the disks spaced from the wire when said equalizer means is in said given position and effecting movement of the disks into peripheral engagement with the wire when said equalizer means moves to said second position thereof, the wire having frictional engagement with the disks and causing rotation of the latter on their mountings as said disks revolve around the wire due to rotation of the unit.

GEORGE E. FORSBERG.

REFERENCES CITED

The following references are of record in the file of this patent:

UNITED STATES PATENTS

| Number | Name | Date |
|---|---|---|
| 1,823,989 | Sanderson | Sept. 22, 1931 |
| 1,857,769 | Silberstein | May 10, 1932 |
| 1,956,951 | Hinsky | May 1, 1934 |
| 2,126,810 | Pugh | Aug. 16, 1938 |
| 2,344,610 | Hargreaves et al. | Mar. 21, 1944 |
| 2,366,944 | Veit | Jan. 9, 1945 |